United States Patent
Schmirgel et al.

(10) Patent No.: US 9,102,061 B2
(45) Date of Patent: Aug. 11, 2015

(54) PROCESS MODULE LIBRARY AND PROGRAMMING ENVIRONMENT FOR PROGRAMMING A MANIPULATOR PROCESS

(75) Inventors: Volker Schmirgel, Augsburg (DE); Gerhard Hietmann, Herbertshofen (DE); Sebastian Reitelshofer, Nuremberg (DE); Simon Klumpp, Neuhausen (DE); Johannes Kurth, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 209 days.

(21) Appl. No.: 13/578,678

(22) PCT Filed: Feb. 25, 2011

(86) PCT No.: PCT/EP2011/000943
§ 371 (c)(1),
(2), (4) Date: Aug. 13, 2012

(87) PCT Pub. No.: WO2011/104033
PCT Pub. Date: Sep. 1, 2011

(65) Prior Publication Data
US 2012/0317535 A1 Dec. 13, 2012

(30) Foreign Application Priority Data

Feb. 26, 2010 (DE) .......................... 10 2010 009 474
Mar. 24, 2010 (DE) .......................... 10 2010 012 598

(51) Int. Cl.
*B25J 9/16* (2006.01)
*G05B 19/04* (2006.01)
*G05B 19/042* (2006.01)

(52) U.S. Cl.
CPC .............. *B25J 9/1661* (2013.01); *B25J 9/1671* (2013.01); *B25J 9/1687* (2013.01);
(Continued)

(58) Field of Classification Search
CPC ...... B25J 9/1656; B25J 9/1661; B25J 9/1671; B25J 9/1687; G05B 19/0426; G05B 2219/23258; G05B 2219/36025; G05B 2219/40099; G05B 2219/40392

USPC .................................................. 700/245, 264
See application file for complete search history.

(56) References Cited

U.S. PATENT DOCUMENTS 5,841,959 A * 11/1998 Guiremand ................... 345/440
6,292,715 B1    9/2001 Rongo
(Continued)

FOREIGN PATENT DOCUMENTS

DE    197 51 955 A1    6/1999
DE    198 53 205 A1    6/2000
(Continued)

OTHER PUBLICATIONS

Bischoff, Rainer et al., "The MORPHA style guide for icon-based programming", 2002, 6 pages, downloaded from http://citeseerx.ist.psu.edu/viewdoc/download?doi=10.1.1.20.4491&rep=rep1&type=pdf.*
Kuka Icon Editor (KIE) software manual, Release 4.0, 2003, IconEditor R4.0 03.01.00 en, 157 pages.*
(Continued)

*Primary Examiner* — Behrang Badii
*Assistant Examiner* — David Testardi
(74) *Attorney, Agent, or Firm* — Wood, Herron & Evans, LLP

(57) ABSTRACT

A process module library according to the invention for programming a manipulator process, in particular an assembly process, comprises a plurality of parametrisable process modules ("search( )", "peg_in_hole( )", "gear( )", "screw( )") for carrying out a sub-process which in particular is common to different manipulator processes. Each of the process modules comprises a plurality of basic commands of a common set of basic commands for carrying out a basic operation, in particular an atomic or molecular operation, and a process module can be linked, in particular mathematically, to a further process module and/or a basic command. During programming, a manipulator can be controlled by means of a functional module of a graphic programming environment (100).

20 Claims, 3 Drawing Sheets

Figure 3:
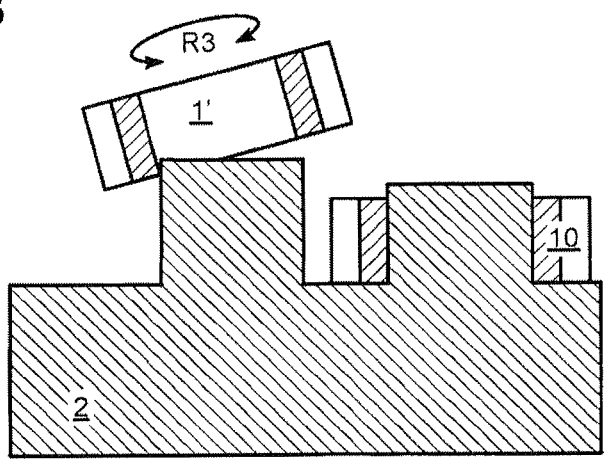

(52) U.S. Cl.
CPC . *G05B 19/0426* (2013.01); *G05B 2219/23258* (2013.01); *G05B 2219/36025* (2013.01); *G05B 2219/40099* (2013.01); *G05B 2219/40392* (2013.01); *G05B 2219/40395* (2013.01)

(56) References Cited

U.S. PATENT DOCUMENTS

| | | | |
|---|---|---|---|
| 6,437,805 B1* | 8/2002 | Sojoodi et al. | 715/763 |
| 6,912,428 B2* | 6/2005 | Nakai et al. | 700/18 |
| 7,000,190 B2* | 2/2006 | Kudukoli et al. | 715/763 |
| 7,069,517 B2* | 6/2006 | Washington et al. | 715/763 |
| 7,181,314 B2* | 2/2007 | Zhang et al. | 700/254 |
| 7,210,117 B2* | 4/2007 | Kudukoli et al. | 717/100 |
| 7,643,907 B2* | 1/2010 | Fuhlbrigge et al. | 700/264 |
| 7,917,863 B2* | 3/2011 | Chandhoke et al. | 715/771 |
| 8,260,460 B2* | 9/2012 | Sanders et al. | 700/245 |
| 8,410,732 B2* | 4/2013 | Kassow et al. | 318/372 |
| 8,504,188 B2* | 8/2013 | Keibel | 700/187 |
| 2007/0150102 A1* | 6/2007 | Park et al. | 700/245 |
| 2010/0145509 A1* | 6/2010 | Zhang et al. | 700/245 |

FOREIGN PATENT DOCUMENTS

| | | |
|---|---|---|
| DE | 10 2008 027 475 A1 | 12/2009 |
| EP | 0 657 043 B1 | 6/1995 |
| EP | 0 852 346 B1 | 7/1998 |
| WO | WO 2006043873 A1 * | 4/2006 |
| WO | 2007/099511 A2 | 9/2007 |
| WO | 2008119383 A1 | 10/2008 |
| WO | WO 2008119383 A1 * | 10/2008 ............ B25J 9/16 |

OTHER PUBLICATIONS

ISO Standard 15187 (Manipulating industrial robots—Graphical user interfaces for programming and operation of robots (GUI-R)), First Edition, Nov. 1, 2000, 32 pages.*
Kelly, James Floyd, "LEGO® Mindstorms NXT-G programming guide", 2007, Chapters 1-4, 21, 23, 24, and 26.*
Kim, Seung Han et al., "Programming LEGO Mindstorms NXT with visual programming", IEEE International Conference on Control, Automation and Systems 2007, Oct. 17-20, 2007 in COEX, Seoul, Korea, pp. 2468ff.*
Kuhlenkötter, Bernd, "Force control for machining applications", ABB 2008, 41 pages, downloaded from http://www.rst.e-technik.tu-dortmund.de/cms/Medienpool/Downloads/Veranstaltungen/Dortmunder_Regelungstechnische_Kolloquien/2007_2008/Vortrag1_0708_Kuhlenkoetter.pdf.*
Kuka Roboter GmbH, "Style guide for icon based programming", 2002, 55 pages, downloaded from http://www.morpha.de/download/MORPHA_Style_Guide.pdf.*
European Patent Office; Search Report in International Patent Application No. PCT/EP2011/000943 dated Jul. 5, 2011; 1 page.
German Patent Office; Office Action in German Patent Application No. 10 2010 012 598.9 dated Mar. 24, 2010; 4 pages.
James Daniel Morrow; Publication entitled "Sensorimotor Primitives for Programming Robotic Assembly Skills" dated May 1997; 186 pages.
Matthew Wayne Gertz; Publication entitled "A Visual Programming Environment for Real-Time Control Systems" dated Nov. 22, 1994; 198 pages.
European Patent Office; Search Report in European Patent Application No. 11 707 795.8 dated Sep. 12, 2014; 8 pages, (in German).

* cited by examiner

Fig. 1
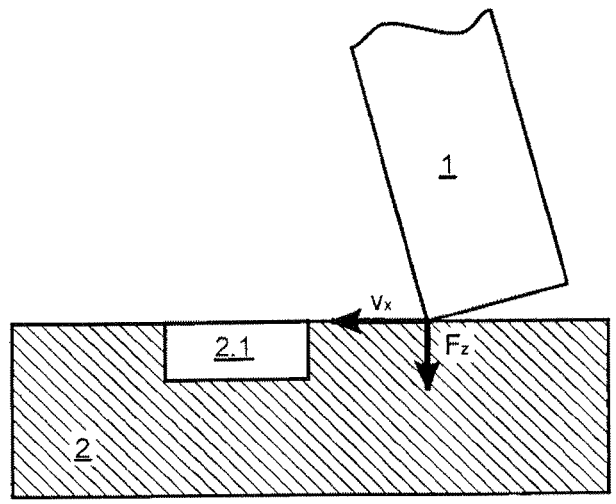
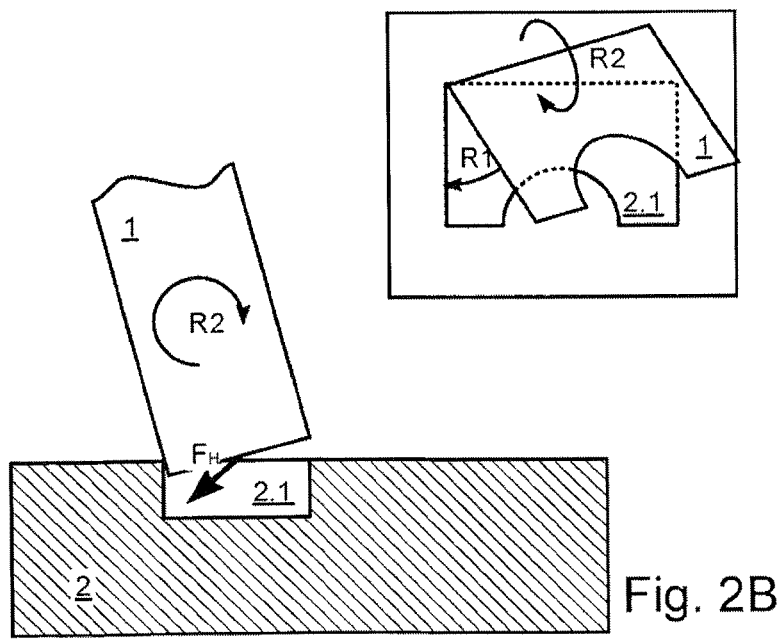
Fig. 2A
Fig. 2B

PROCESS MODULE LIBRARY AND PROGRAMMING ENVIRONMENT FOR PROGRAMMING A MANIPULATOR PROCESS

The present invention relates to a process module library and a graphical programming environment for programming a manipulator process, in particular an assembly process executed by means of a manipulator, a method for programming a manipulator process by means of a process module library and/or graphical programming environment of said type, and a method for creating a process module library of said type.

Conventional, rigid position-regulated industrial robots can be programmed via links to a simple basic command of a readily understandable set of basic commands such as "LIN," "CIRC," and "PTP" for the specification of a linear, arc segment shaped, or axle guided, movement between learned poses, that the rigid position-regulated industrial robot then executes precisely.

Manipulators and the controls thereof are becoming, however, increasingly more complex, such that their potential, in particular for non-specialized users, cannot be fully exploited, or can only be exploited with a large time expenditure and the corresponding susceptibility to error.

As such, compliant-regulated lightweight construction robots, for example, enable an efficient and gentler contact between a tool or part guided by a manipulator, and the surroundings. But the programming, requiring a corresponding regulation, in particular with status transitions having varying structures, with the specification of varied force and termination conditions, regulation parameters, and signal processing, in practice still requires too much time and qualification expenditure, and as such, in particular for the automation of the assembly of smaller batch sizes, is ineffective.

Alternatively, even simple industrial manipulator processes such as the initiation of a retaining pose on a straight track, the subsequent closing of the gripper, the proceeding to an assembly pose with the subsequent opening of the gripper and the return to a start-up pose, is currently programmed in an awkward manner in that the individual basic commands are programmed in a high level language, such as the "Kuka Robot Language" ("KRL"), for example, the fundamental poses for this are taught subsequently, and following this, the program is tested. If the program is to be corrected or modified, by means of modifying or supplementing the basic commands and/or poses, for example, this process must be executed repeatedly, a number of times, which, together with the expert knowledge necessary for mastering the programming high level language, works in particular against the use of robots in small and medium sized companies.

The objective of the present invention is to improve the programming of an, in particular industrial, manipulator process.

This objective is attained by means of a process module library having the characteristics of Claim 1 and/or by means of a graphical programming environment having the characteristics of Claim 10. Claim 7, or respectively, Claim 19, protects a method for programming a manipulator process by means of a process module library according to the invention, or a graphical programming environment according to the invention, respectively, Claim 9 protects a method for creating a process module library, and Claim 20 protects a computer program product, in particular a data medium, or respectively, a storage medium, for storing a process module library according to the invention and/or for executing a method according to the invention. The dependent Claims concern advantageous further developments.

According to a process module library aspect of the present invention, in a preferred design for various manipulator processes, in particular for various assembly processes such as the joining of different components, for production and/or application processes, in particular transport processes which, by means of one or more manipulators, in particular robots having preferably at least six movement axes, preferably lightweight construction robots such as the LBR of the applicant, are used, wherein sub-processes are first identified that are common to the different manipulator processes. In addition to one or more manipulators, the manipulator processes may also comprise auxiliary axes, or transport or mounting devices, and the like, such as rotary and tilting tables and the like, which can also be programmed according to the invention.

As such, it is possible that, in particular with corresponding placement and/or production tolerances, for example in the joining of shaft-hub connections, the joining of gear wheels, and the screwing of a component in a threading, the automatic searching of an appropriate respective starting pose is required. In that a process module for executing the sub-process "(start)pose search" is made available according to the invention, which is adapted to the respective assembly process via a corresponding parameterization to the respective requirements of the assembly process, and can be linked to other process modules, such as for screwing and checking the success of the process, and such as the targeted pre-tightening, for example, a non-specialized user can also quickly and reliably program or, respectively, create more complex manipulator supported assembly processes, thereby making use of the potential of new manipulators such as, for example, lightweight construction robots and/or new controls, such as a compliant- or force-regulation, in order to optimize the process.

For the creation of a process module of this type, according to one design of the present invention a shared basic set of commands is identified and created from basic commands.

For this the sub-processes are broken down into atomic or molecular basic operations, wherein an atomic basic operation as set forth in the present invention in particular is an operation of at least one manipulator that cannot be broken down further, such as that denoted by the toggling between different regulations, a simple geometric movement such as the assuming of a second pose from a first pose along a straight or circular path in a Cartesian or node coordinate space, or the opening of a gripper, and a molecular basic operation corresponds to an operation, which, although it can conceivably can be broken down into even smaller, atomic individual operations, is however always executed in the sub-processes as a whole, such as the following of a predetermined path in a collision free manner via auxiliary or intermediate poses. For creating the basic set of commands it may be advantageous to access already existing basic commands, such as those contained in a conventional programming language, for example.

The process modules created through the linking of basic commands of this type are provided in a parameterized form in a process module library. The user can then quickly, simply, and without error, program the manipulator process through specifying the parameters of the process module and its links to other process modules or basic commands. In this manner, a programming that is complex and difficult to master for a non-specialized user can be substantially replaced by a parameterization.

A program module in the present case is, in particular, a process module that can be parameterized, for which the user can specify one or more parameters, by way of example, by means of retrieving said parameters having corresponding operational values, through the use of a shared data or storage region, and/or by means of leaving intact, or not modifying, respectively, default values, which, for example, are specified by the user in advance, or already specified by the manufacturer.

A shared sub-process as set forth in the present invention, preferably for various manipulator processes, can also be a complete manipulator process.

The linking of basic commands collectively to a process module, of one process module with another process module, and of one process module with a basic command, is obtained from a programming perspective preferably by means of mathematical operations or operators, respectively, such as transformations of program values which, for example, define manipulator poses, in particular through logical operations or operators such as implications ("if-then"), and program instructions such as loops and similar instructions formed therefrom. With a graphical programming environment, the linking can be obtained, in particular, graphically, by means of connecting, superimposing process modules or basic commands, or configuring said process modules or basic commands adjacently or above one another.

According to a preferred design of the present invention, at least one parameter of a process module defines a type of the sub-process carried out via said process module. In this manner, for example, a pose search may be obtained on one hand by the searching for a recess with a projection guided by a manipulator, for example, by "feeling" a hole with a peg, and on the other hand, by searching for a projection with a recess guided by a manipulator, as well as, for example, movement along a straight path, a zigzag path, a spiral path, a sinusoidal shape or a Lissajous curve. By specifying a parameter that defines whether a search is made with a projection guided by the manipulator, or a recess guided by the manipulator, and one other parameter, which defines the type of searching path, the types "searching with a projection guided by a manipulator along a straight path," "searching with a projection guided by a manipulator along a zigzag path," "searching with a recess guided by a manipulator along a straight path," etc. can be programmed with the same process module "pose search."

Additionally, or alternatively, at least one parameter of a process module can define a kinematic property of a manipulator. As an example, the same tool paths of manipulators can be executed with different geometries, such as axis spacings, for example, and/or different structures, such as articulated arm, SCARA, portal, or redundant manipulators. In that for these different kinematic properties the same process module is made available, and by specifying one or more parameters, for example a recognition of the structure and/or value for the different geometric dimensions, such as axis spacings, for example, are parameterized by the user, said user can program a manipulator process without further knowledge of and consideration for the kinematics of the manipulator.

Preferably, a sub-process comprises a pose search, in order, for example, despite tolerance conditional displacement of joining partners in successive process repetitions, to assume the respective appropriate start poses for joining.

For this, a manipulator can move a tool or workpiece on a surface along a predetermined path, wherein the manipulator preferably applies a force component perpendicularly to the surface. In this manner, a projection guided by a manipulator is forced into a recess being searched for when it encounters said recess, or respectively, a recess guided by a manipulator is forced onto a projection being searched for when said projection is encountered, thereby acting against a continuation of the movement in a form-locking manner. This can be detected by a corresponding increase in force, or a pausing in the achieved pose, despite a command for continuation of movement.

Preferably, the manipulator is regulated in a compliant manner with regard to positioning or force, in a plane that is perpendicular and/or parallel in at least one plane to the scanned surface.

A compliant-regulation perpendicular to the scanned surface can prevent damage to said surface. A position-regulation parallel to the scanned surface enables movement along fully defined searching paths, such as, for example, a straight line, while a force-regulation, such as the application of an alternating force perpendicular to a position-regulated straight line also enables the scanning of unknown surface geometries. Preferably, the manipulator is regulated in a compliant manner in the direction of the search, in order that the workpiece not be damaged when it encounters the recess/projection with the projection/recess, respectively. In a plane perpendicular to this, and parallel to the surface that is to be scanned, the manipulator can be regulated in terms of positioning or force, in order to implement a search path that is fully defined or adapted to a workpiece.

A preferred predefined search path can run over the surface to be scanned, deviating directly or alternatingly from a straight line, wherein the positioning or force is regulated, in particular in a zigzag, sinusoidal, or meandering shape, as a circular path having a constant or varying radius, along a Lissajous curve, or stochastically.

Preferably, a projection, with which a recess is searched for, or respectively, a recess, with which a projection is searched for, is tilted during the search, at a predetermined angle to an assembly direction between the projection and recess, preferably between 10° and 80°, which is, for example, an axis of symmetry for a rotationally symmetrical peg and a corresponding hole, in order to both ensure a secure insertion of the projection in the recess, and to prevent any damage.

According to a preferred design of the present invention, one sub-process comprises a joining through establishing a form-locking joint, such as the insertion of a peg in a hole, or the placing of a hole onto a peg, for example.

Starting from a start pose, known for example from a previous pose search, an advantageously rotationally symmetric, in relation to a assembly direction, projection, tilted at an angle to the assembly direction, preferably between 10° and 80°, is first inserted in a recess, in that the projection and/or recess is moved by means of the manipulator. This can take place in a position-regulated manner for the purpose of reducing the process time, whereby, upon making contact at the latest, a force- or compliant-regulation can be activated in one or more planes, in order to prevent damage. In this regulation a preload force is preferably applied, which prevents the projection from slipping out of the recess. Subsequently, the projection is oriented in the assembly direction and inserted, whereby in a preferred design a vibration perpendicular to the assembly direction and/or a turning about the axis of the assembly direction is applied, in order to prevent canting during the insertion.

If instead, a non-rotationally symmetrical cross-section, a triangular cross-section, for example, is to be joined, a corner of the projection can be first placed in a corner of the recess for this purpose, and subsequently the projection is re-oriented about an axis of the assembly direction, and subsequently inserted perpendicularly to the assembly direction while being vibrated.

Similarly, after the movement, a corner having, for example, a quadratic cross-section, is first re-oriented about one axis, and then subsequently re-oriented about another axis, in order to align the projection in the corner that has been approached such that it is supported in the recess, and thus can be joined reliably.

Preferably a sub-process comprises a joining with numerous form-locking joints, e.g. the insertion of a peg in a through-hole and subsequently in a second through-hole, or a blind hole, lying behind this, or the application or insertion of a gear wheel that is previously, simultaneously, or subsequently meshed with another gear wheel.

In the joining of a gear wheel, preferably a position-, force- or compliant-regulation of a rotational movement perpendicular to the assembly direction is applied, in order to align the gear teeth to one another.

According to a preferred design, the present invention comprises a sub-process of screwing an internal threading onto an external threading, or respectively, an external threading into an internal threading. For this, if applicable, through one or numerous displacements of the manipulator tool over a limited tool screwing angle, it is possible to first tighten said configuration until, with an increase of force, or a pause in a pose, despite a commanded feed motion, a first screwing position has been reached. This occurs preferably while regulated in terms of force and/or compliancy. Subsequently, in an advantageous further development, it is possible for at least one of the position-regulated workpieces that is to be screwed, to be turned further through a predetermined angle, in order to ensure a predetermined tightening.

Preferably one sub-process comprises a calibration. If, for example, processing or assembly poses are defined in relation to a workpiece, in order to compensate for tolerance conditional deviations from its position in relation to a manipulator, the manipulator can, for example, search for successively distinguished projections, recesses, or edges of the workpiece with its tool, as explained above in reference to the pose search. If as a result, at least three poses, by means of which the Cartesian position of the tool in relation to the workpiece, and thereby three distinguished points on the workpiece, have been detected, a workpiece reference system can be automatically established thereby, which is the so-called BASE coordinate system.

According to a preferred design, the present invention comprises one sub-process consisting of a checking the success of the process. For this, reaction forces can be detected on a manipulator, in particular, they can be checked as to whether said forces lie within a predetermined range. If, for example, as described above, a screw is tightened further over a predetermined angle after reaching a first tightening position detected by means of an increase in force, then the force acting on the manipulator thereby, in this case a torque at the turning axis, can be determined. If said force is within a predetermined range, then the screw has been tightened to the desired tension.

Additionally, or alternatively, in particular with compliant- or force-regulation in at least one plane, the pose that has been assumed, or its components, can be compared with compliant-or force-regulated planes having predetermined values. If, for example, as described above, a peg is inserted in a hole while compliant-regulated, it can be determined whether the end position that has been reached, paused in the manipulator due to the compliancy regulation, corresponds to a predetermined assembly end position.

For this, a predetermined force or movement can be commanded, and the movement or reaction force implemented thereby can be determined and compared with predetermined values. In this manner, for example, after the assembly a click-in connection can be stressed in the releasing direction with a predetermined force or a predetermined target release movement, and the force acting against said force or movement, or respectively, the targeted actual movement, can be determined. If the counter force is too small, or the actual movement is too large, then the click-in connection releases.

A basic operation can comprise a regulation, in particular the toggling between a position-, force- and compliant-regulation, preferably with the detection of a contact to the surroundings by the manipulator.

In addition, or alternatively, a basic operation may comprise a movement. Preferably a basic operation comprises an automatic movement of the manipulator for this, in such a manner that one or more of the contact forces acting thereon are reduced, or, in particular, entirely eliminated. If, for example, as stated above, a projection is inserted in a recess, tilted at an angle, and subsequently re-oriented about an axis, the one joining partner exerts a pre-tension, against a tolerance direction, on the other joining partner while in the re-oriented position, in that the two joining partners are offset against one another. By determining this force and with a corresponding compensation movement in this direction, the manipulator can align both joining partners prior to the insertion or placement, thereby reducing the contact force occurring due to the offsetting.

A basic operation can comprise a checking of a condition, in particular a termination criterion. A termination criterion of this type may be fulfilled, for example, when a manipulator does not change its pose for a predetermined period of time, or only changes said pose within a predetermined tolerance. In this manner, in particular with compliant- or force-regulated movements, an end pose that has been obtained can be detected.

According to a preferred design, the present invention comprises one basic operation, a compliant-regulation and/or force-regulation, in particular the toggling from or to one of the above, and/or a compliant- or force-regulated manipulator movement.

A compliant-regulation refers, as set forth by the present invention, in particular to a regulation wherein a manipulator exerts a resistance, reduced in a predetermined manner, against an external force applied to said manipulator, or respectively, compensates for a force resulting from the development of a predetermined restoring force or compensation for a weight. This can be accomplished in a simple manner by means of the reduction of a proportional and/or differential portion and/or the elimination of an integral portion of a PID single joint regulation, or through the restriction to a single value of the drive forces of the manipulator that is lower than that necessary for a drive safeguard, wherein with the present case, for a more compact presentation, anti-parallel pairs of forces, i.e. torques, are referred to as forces in the general sense of the term. It is preferred, however, that a compliant-regulation be implemented by means of an impedance-regulation, in which the manipulator is position-regulated in a manner corresponding to a predetermined dynamic behavior, such as the laws of force pertaining to a spring or a mass-cushion-spring system, by means of a change of its pose in reaction to a force acting on said manipulator, via an admittance regulation, in which the manipulator, which is force-regulated according to a dynamic behavior having corresponding drive forces, reacts to a change in its pose, or modifications or combinations of said regulations. An over-view of compliant-regulations of this type, suited in particular for lightweight construction robots, is given, for example, in A. Albub-Schäffer et al., "Cartesian Impedance Control Techniques for Torque Controlled Light-Weight Robots," Proc. IEEE Int. Conf. on Robotics & Automation, Washington D.C., 2002, pages 657-663. Preferably, a force-regulation can be added to a compliant-regulation in such a manner that in addition to the force resulting from the predetermined dynamic behavior, a predetermined, for example, constant, force is preset or regulated as a target force to be exerted by the manipulator.

Process modules can, for example, be implemented, in particular, programmed and/or used, as function commands in a conventional programming language for the programming of manipulators, such as the language KRL by the applicant, for example.

A parameterization can result preferably from a corresponding input, use of default values, and/or value acquisition from other applications, for example a data set for a manipulator model, of regulation parameters and/or process parameters, in particular tool and/or workpiece parameters. A portion of the parameters can be generated or acquired, in particularly automatically, for example on the basis of the kinematics, the processes, the tool, and/or the workpiece, and from tolerances, material, shape, etc. For example, an assembly process can be defined in a simulation environment, in which all relevant data in the form of model data are then present. In a preferred design, the necessary process modules are then automatically selected and (sub-) parameterized by means of a program. In a second step, the respective parameters that are not automatically determined are then manually set by a user.

In an advantageous further development, such process modules can also be implemented in a graphical programming environment or interface, respectively. This also enables, in a particularly simple manner, users without expert knowledge to program more complex manipulator processes. For this reason, a programming environment aspect of the present invention that will be explained in greater detail below, which is basically independent of the process module library aspect, can be realized, preferably in combination with this process module library aspect.

According to the programming environment aspect of the present invention, a graphical programming environment for the programming of a manipulator process, in particular a process described above with respect to the process module library aspect, can be made available, or used, respectively, having numerous graphic function modules for the execution of one sub-process in each case, by means of which said sub-process can be programmed or implemented, respectively.

According to the invention, it is now possible to control one or more sub-processes and/or one or more manipulators already during the programming, in particular online, by means of said function module. For this, a control of a sub-process or manipulator, respectively, in particular an industrial robot, in particular an actuation of a manipulator tool and/or a manipulator periphery, for example a workpiece acquisition, a rotating or tilting table, an external glue nozzle, or similar item, is understood to mean a movement of the manipulator, or a toggling of its status, in particular a regulation etc., whereby a control taking into account retrieved dimensions, i.e. a regulation, is also referred to as a control for the purpose of a more compact presentation. A retrieval and/ or storing of a manipulator pose, or the status of a manipulator or periphery, by means of a function module is also referred to as a control of said sub-process or manipulator, respectively, by means of said function module.

According to the invention, a graphic function module therefore serves for the programming, in particular the creation of a work program, as well as the, preferably simultaneous or parallel control of one or more manipulators and/or sub-processes, in particular a unidirectional or bidirectional interactive control, in that the user commands actions of the manipulator(s) and/or conveys said information, with respect to its pose(s) status(es) etc., for example. In particular in connection with the previously explained process module library aspect, it is also possible, advantageously, for a parameterization of a process module to be carried out thereby, which activates a corresponding function module, and to input or modify parameters by means of said function module. In doing so, parameters can also be detected, and the process module can be automatically parameterized accordingly. For example, a robot gripper can be closed by means of a function module of a robot gripper, a closing force can be detected thereby through measuring said force exerted by the robot, and said force can automatically be acquired as a parameter in a process module, as a target or maximal value, for example. In a similar manner, an application such as a CAD application can be called up by means of a function module, for example, and parameters for a process module can be acquired from said application.

In contrast to the known sequential programming in a high level language, with subsequent teaching thereby of the fundamental poses, the uploading of the completed program in a manipulator or process control, and testing and frequent numerous iterative running of said sequence, it is, in this manner, also possible for a user having no expert knowledge to program a manipulator process in a very intuitive manner.

As an example, previously the moving to a retaining pose along a straight path, the subsequent closing of the gripper, the moving to an assembly pose with the subsequent opening of the gripper, and returning to the starting pose, was sequentially programmed with a great deal of effort, in that in a high level language, first the individual basic commands "moving to a first pose," "closing the gripper," "moving to a second pose," "opening the gripper," and "moving to a third pose," were programmed in an abstract manner. Subsequently, the manipulator is driven to the retaining pose, the assembly pose, and the starting pose, this was then stored, and the first, second, or third programmed poses were designated, before the program created in this manner is compiled, uploaded to the manipulator control, and tested. If modification was required thereby, which could not yet be detected in the abstract programming, then this sequential process had to be run repeatedly, extensively.

In contrast to this, according to one design of the present invention, the manipulator can already be controlled online during the programming by means of the accessed function module "move to a pose," in that, for example, by calling up the function module, an input possibility for the guidance of the manipulator into a pose, and the storing of this learned pose, is implemented as a pose of the function module. In this manner, the manipulator can be moved accordingly, directly during the programming, such that even a user with little instruction can create a program, in that he successively selects the next function module based on a respective initiated pose or a completed action.

Preferably, the created (sub-) program is already functional during the programming, i.e. the insertion of further function modules, and enables thus a testing, or improvement, respectively. In particular, it may be provided that the function modules, or the sub-processes implemented by said function modules, respectively, can already be executed directly, during the programming, i.e. by calling up, or activating, respectively, a function module, for example, which reproduces a movement, such that said movement can be executed directly.

As explained in the beginning, a preferred design of a function module can reproduce a process module or a basic command of a process module library according to the process module library aspect, such that, in particular, characteristics that are described in the context of the process module library aspect can also be realized individually or in combinations in accordance with the programming environment aspect. In this manner, for example, it is also possible to provide default values for parameters that can be entered or changed by the user, which are automatically assumed insofar as the user does not actively change them. In a similar manner, according to this aspect, simple manipulator processes created from basic commands, such as with the assembly along a straight path described above, for retaining and assembly poses, is now intuitive and can be programmed by a user without expert knowledge.

According to a preferred design, a function module is disposed as a graphic representation in the form of an icon on a display interface. An icon of this type preferably comprises a representation of the kinematics, action, and/or an information, preferably dependent on the kinematics and/or action. Preferably, this representation changes depending on a parameterization of the selected function module. For example, the kinematics can first depict a representative fundamental pose of the manipulator that is to be controlled, and, for example, after the parameterization of the selected function module, represent the end pose implemented by means of the function module. In addition, or alternatively, the action of the manipulator implemented by means of the function module, such as a movement or the actuation of a tool, can be symbolized with a film sequence, in order to further facilitate the intuitive programming.

Preferably, a function module can be manipulated by means of touching a display interface, in particular a touch-screen, such that by means of clicking, drag & drop, etc., a selection, positioning, in particular moving and locking in place, calling up, and/or (de)activation can be initiated. As an example, a user can select a function module from a function module library in which available function modules are displayed by means of touching an icon, drag said function module to a functioning or programming field, anchor said function module there by letting go, and by tapping said function module again, if applicable, to activate input windows or buttons opened by said function module.

Function modules can automatically be linked, preferably depending on their positions. As an example, a linking of two function modules can be automatically obtained in that, in the manipulator process, first the upper, or left function module is executed, and after it has been executed, the lower, or right function module is executed, in that the subsequent function module to be executed is positioned below or to the right, in the vicinity of the function module that is to first be executed. In addition, or alternatively, it is also possible to create links of this type, or respectively, to modify said links, in that representations of the links, such as lines or arrows between the icons can be modified by touching said icons, and said icons can then be linked to other icons, for example.

According to a preferred design, one or more elements of a function module, depending on a user's status, can be modified. As an example, higher priority users can selectively authorize or restrict the modification of parameters by lower priority users. Likewise, in this manner certain elements, such as input possibilities or parameters, depending on a user status, can be displayed or hidden, in order that the clarity and the tendency towards error be improved for users having less training.

Figure 4:
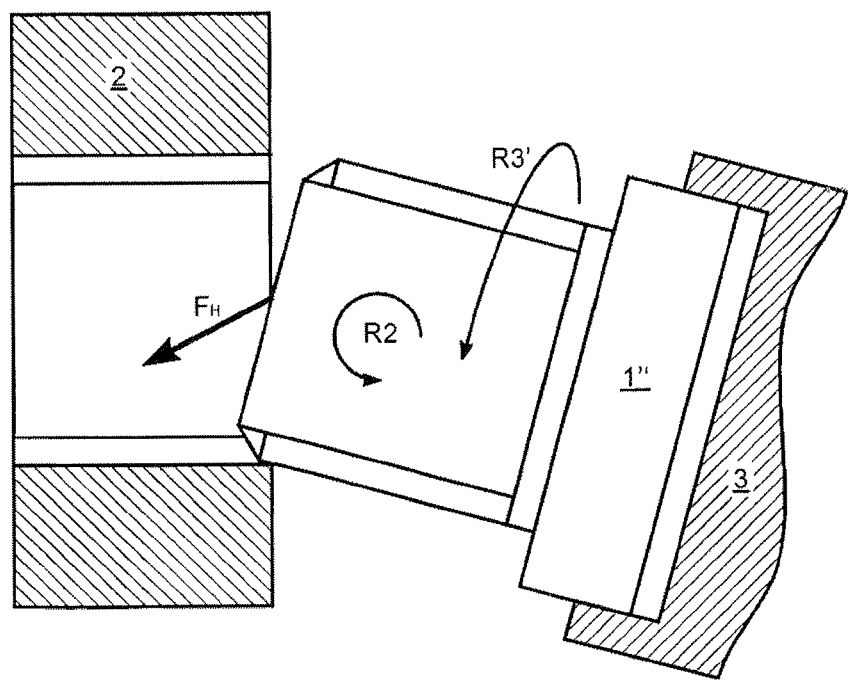

Other advantages and characteristics may be derived from the dependent claims and the design examples. For this, the drawings depict, schematically in part:

FIG. 1: A pose search according to a design of the present invention;

FIG. 2A: A joining through movement toward a corner, with subsequent re-orientation about two axes, according to one design of the present invention, in a perspective from above;

FIG. 2B: The joining according to FIG. 2A, from a lateral perspective;

FIG. 3: A joining of two gear wheels according to one design of the present invention;

FIG. 4: A tightening of a screw according to one design of the present invention; and FIG. 5: A graphical programming environment according to one design of the present invention.

FIG. 1 shows a program pose search by means of a process module according to one design of the present invention.

For this, a lightweight construction robot (not shown) places a peg 1 at an angle of 15° to an insertion plane (vertical according to FIG. 1) of a recesses 2.1 that is to be searched for in the surface of a workpiece 2 that is to be scanned, in a position-regulated manner, tilted on said surface, and, upon making contact, immediately switches over to a compliant-regulation in at least one Cartesian translational and/or rotational plane, in order to prevent damage to the workpiece 2.

A force- or compliant-regulated force $F_z$ is then applied, perpendicular to the surface that is to be scanned, to pre-load the peg 1 in the recess 2.1 when it is moved over said recess. The peg is moved while compliant-regulated in a search direction $v_x$, in which an end point of a virtual spring, which is reproduced between said surface and the peg 1 via the compliant-regulation, and moved in the search direction $v_x$. The robot is position-regulated, perpendicular to the search direction and parallel to the surface being scanned, in order to follow the predetermined search path.

This can, for example, be predefined on the surface to be scanned by one or more straight, zigzag, circular or spiral paths. Likewise, an alternating, e.g. sinusoidal shaped force can also be applied in a plane parallel to the surface to be scanned and perpendicular to the searching direction and/or in the searching direction, in order to follow a sinusoidal path or a Lissajous curve.

If the peg 1 passes over the recess 2.1, the force $F_z$ presses it into said recess such that further movement is opposed by resistance. The regulation of the robot detects a corresponding increase in contact force along the v, axis, or respectively, a pause despite commanded further movement of the end point of the virtual spring, and thereby recognizes that the peg 1 is in the recess 2.1 that is being searched for, as a result of which, the pose of the robot that is searched for, e.g. a starting pose for a joining of the peg 1 in the recess 2.1 has been found.

In order to facilitate this complex search, having toggling between various regulations, detection of contact forces, and the definition of suitable search paths, an assembly module "search(p1, p2, p3, p4, p5, p6, p7, p8, p9, p10)" is made available for a single use, in advance, from basic commands, which command the aforementioned atomic and molecular basic operations, that can be parameterized through the parameters p1-p10.

For this, parameter p1 defines whether a recess 2.1 is being searched for with a projection 1, or the reverse of this, wherein a projection on a workpiece is to be searched for with a recess.

Parameter p2 defines the shape of the search path, e.g. in the form of a straight, zigzag, spiral, sinusoidal, or Lissajous path. Parameter p3 defines a contact force or a tracking error at the end point of the virtual spring, which, when reached, completes the search, parameter p4 defines a pose for determining a starting pose for the search, e.g. the end pose of a tolerance-free assembly process, parameter p5 defines the pressure $F_z$, and parameters p6, p7 describe the tracking speed in the search direction, and the width of the search path, or respectively, with Lissajous paths, the amplitudes in the search direction and perpendicular thereto. Parameter p8 defines a frequency of a radius enlargement of the search path, and parameters p9, p10 define a frequency and amplitude of an optimal rotational movement about the longitudinal axis of the peg 1.

As one sees, through the input of a few parameters, different complex pose searches can be programmed.

FIGS. 2A, 2B show a joining programmed by means of a process module according to one design of the present invention, with the moving of a corner and subsequent re-orientation about two axes, from a top view and a lateral view, respectively. This can occur following, in particular, the pose search explained above in reference to FIG. 1, in that a corresponding, assembly module "peg_in_hole( )," to be explained in greater detail below, is linked to the module "search( )." For this, the pose search can be carried out with the workpiece that is to be joined, or with a tool of its own.

One sees in the top view of FIG. 2A the complex, bridge-like cross-section of the peg 1 or the recess 2.1.

For the joining, the lightweight construction robot first moves, position-regulated, a tip (upper left in FIG. 2A) of the peg 1, tilted 15° to the assembly plane (vertical in FIG. 2B), into the recess 2.1 and switches immediately to a compliant-regulation upon making contact, in the three Cartesian translational and rotational planes, in order to prevent damage to the workpiece 2. Similarly, the pose arrived at in the pose search, as stated above, may be used as the starting pose for the joining.

At this point a target force $F_H$ (see FIG. 2B) is applied to the peg 1, having one component in the joining direction (vertically downwards in FIG. 2B), and one component for the edge (upper left) of the recess 2.1 in which the inserted tip is to be placed, in that, for example, the end point of the virtual spring is placed in or behind said edge. By this means, the peg 1 is retained in the recess 2.1 during the subsequent re-orientation, and its upper left tip in FIG. 2A is drawn toward the designated edge.

The peg is then first re-oriented about a first axis, e.g. its longitudinal axis, such that a shorter lateral surface, e.g. its left lateral surface, is positioned in relation to the corresponding inner surface of the recess 2.1, as indicated in FIG. 2A by the rotational arrow R1. Subsequently the peg is re-oriented about a second axis, e.g. it upper end edge, such that it longitudinal axis is aligned with the longitudinal axis of the recess 2.1, as indicated in FIGS. 2A, 2B by the rotational arrow R2, wherein the contact between the peg and the recess during said re-orientations is ensured by the applied force $F_H$.

The peg 1 is then, compliant- or force-regulated, inserted into the recess 2.1 in the assembly direction (from up to down in FIG. 2B), whereby a microscopic vibration is generated perpendicular to said direction, in order to reliably prevent a jamming or tilting of the peg. As an example, for the insertion, the end point of the virtual spring is pushed in the joining direction and, in addition, a constant force is applied in the joining direction. If the detected reaction force exceeds a predetermined threshold value due to the position of the peg 1 at the base of the recess, the lightweight construction robot pauses, despite command for further movement, at the assembly end pose defined by the base of the recess, or reduces its assembly speed to zero, and an end of the assembly process can be determined.

In a similar manner, a joining can take place with a cross-section that is rotationally symmetric to the joining direction, and a joining through moving a corner can take place, with subsequent re-orientation about only one axis. When joining rotationally symmetrical cross-sections, a rotation or a torque about the joining direction can be advantageously superimposed on the insertion motion, in order to prevent a jamming. In doing so, instead of an indicated corner, an arbitrary point on the circumference of the end surface may be retained in the recess through the input of a retaining force $F_H$ during the re-orientation.

Whether with non-rotationally symmetric cross-sections the re-orientation occurs about only one axis, in order to compensate for the initial tilt position that ensures an insertion of a corner in the recess, or the re-orientation occurs successively about two axes, as explained above in reference to FIGS. 2A, 2B, it is advantageously determined subsequently, in particular, whether, due to geometric conditions, in particular, the possible initial insertion depth limited by the cross-section, if there is a risk that the projection will slip out of the recess during the re-orientation, as is the case, for example, with rectangular shaped cross-sections. Accordingly, triangular cross-sections can only be joined, for example, with single re-orientations.

In order to facilitate these different, complex joining processes having toggling between different regulations, detection of contact forces and definition of suitable entering, re-orientation and insertion movements, an assembly module "peg_in_hole(p1, p2, p3, p4, p5, p6, p7, p8, p9, p10, p11)" is made available in an assembly module library, in advance, for a single use, from basic commands, which command the aforementioned atomic and molecular basic operations, that can be parameterized via the parameters p1-p11.

For this, parameter p1, as with the pose search, defines whether a recess 2.1 is being searched for with a projection 1, or the reverse of this, wherein a projection is to be searched for with a recess, on a workpiece. Parameter p2 defines the orientation of the tolerance-free joined workpiece. Parameter p3 defines whether a rotationally symmetrical cross-section is concerned, or whether a cross-section with at least one corner is to be re-oriented about one or two axes. Parameters p4, p5 limit a maximum force in the joining direction, or perpendicular to said joining direction, respectively. Parameters p6, p7 define a maximum torque that is to be applied to a re-orientation axis, or a joining direction, respectively, in order to prevent jamming. Parameter p8 limits the maximum joining rate. Parameters p9, p10 select the termination criteria, i.e. whether when a decrease in the movement speed, or a change in the pose, an end pose has been detected, and its value, e.g. a minimal movement speed or pose change. Parameter p11 determines the time period for which the termination criteria according to p9, p10 must be fulfilled in order to detect an end pose.

One sees here as well, that through the input of a few parameters, different complex pose searches can be programmed.

FIG. 3 shows a joining of two gear wheels 1', 10, programmed according to one design of the present invention by means of a process module.

This occurs in a manner substantially similar to the joining of a rotationally symmetrical projection with a recess explained above. In order to ensure a reliable joining, a rotational movement is superimposed on the insertion movement is, as has already been explained, in order to prevent jamming. However, the rotational movement for aligning the gear wheels must exhibit a significantly greater amplitude than that of a micro-rotational movement to prevent jamming, and furthermore, at any case then, at least when at the initiation of the joining movement, the gear teeth also mesh with one another, as is the case when placing gear wheels onto short axles, or having short shafts, respectively, already when moving to the joining starting pose, a re-orientation must be carried out after the initial entering of the projection in the recess, while conversely, in a joining having only one form-locking connection, i.e. without a second form-locking connection formed by the gear teeth, the rotational movement to prevent jamming should only occur after the resulting entering and re-orientation.

With the joining explained in reference to FIG. 2, for the attachment of a gear wheel 1' programmed by means of "gear( ),"a position-regulated joining starting pose can also be first initiated, or searched for, by means of an upstream pose search, in which the gear wheel 1' that is to be joined is tilted at an angle to the joining plane. Upon making contact with the component 2 supporting the other gear wheel 10, a compliant-regulation is toggled to, or respectively, said compliant-regulation is maintained from the pose search. At the same time, a rotational movement is applied to the gear wheel 1' about it rotational axis, in order to align said gear wheel with the gear teeth of the other gear wheel 10. This can be implemented by means of a commanded rotational movement or an alternating torque about the rotational axis. Likewise, the insertion movement can be caused by an advancing movement of an end point of a virtual spring or a predetermined force in the direction of insertion.

FIG. 4 shows a screwing of a screw 1" into a through-hole of a workpiece 2, programmed by means of a process module according to one design of the present invention, guided in a gripper 3 of a lightweight construction robot, which, by the way, is not shown.

This occurs in a manner similar to the joining described above in reference to FIGS. 2, 3: if the screw 1" has not yet been screwed into the hole, the robot moves the screw in a position-regulated manner, tilted at an angle of 15° to the screwing direction, into a joining starting pose (cf. FIG. 4), in which it enters the hole at an angle, and upon making contact, switches to a compliant-regulation, in which a retaining force $F_H$ is applied, in order to retain the screw during the subsequent re-orientation securely in the hole.

The screw 1" is then re-oriented, as indicated in FIG. 4 by the rotational arrow R2, such that its longitudinal axis is aligned with the hole.

In doing so, it is turned in opposition to the screwing direction, as indicated in FIG. 4 by the rotational arrow R3', in order to prevent a jamming of the threading. If the robot gripper 3 is unable to execute an unrestricted turning about the screwing axis, then for this, it is turned in advance in the screwing direction, in order to obtain a sufficient turning angle reserve for said negative turning R3' during the re-orientation.

When the screw 1" and the hole are aligned, the screw 1" is then tightened in the reverse direction of the rotation R3' into the hole, in which a compliant-regulation having a superimposed force-regulation applies an advancing force in the screwing direction and a torque or rotational motion about this tightening direction.

If the robot gripper 3 is unable to execute an unrestricted turning about the screwing axis, it is released from the screw 1" when it has reached its maximum turning in the tightening direction, removed from said screw, turned in opposition to the tightening direction, in order to accumulate a turning angle reserve for further tightening, subsequently place again on the screw, and said screw is tightened, as the case may be, with numerous repetitions of said re-setting, until a termination criterion has been fulfilled. If the screw 1" has been manually tightened in the hole, for example, with numerous turnings, then the tightening process may be first initiated at this point.

A termination criterion may consist of, in particular, a reaching, or respectively, an exceeding of, a predetermined torque due to a complete tightening of the screw 1" or likewise, in a reduction of the speed, or respectively, a missing modification of the pose, which occur with compliant-regulated tightening upon reaching the point where the head of the screw makes contact with the surface of the workpiece. Optionally, it is possible to further tighten the screw subsequently, under a position-regulation, through a predetermined angle, and to detect the counteracting torque in this manner. By comparing these values, the success of the process can be checked, i.e. to see whether the screw has been tightened to the desired tension.

In order to facilitate these different, complex joining processes having toggling between different regulations, detection of contact forces and definition of suitable entering, re-orientation and insertion movements, an assembly module "screw(p1, p2, p3, p4, p5, p6, p7, p8, p9)" is made available in an assembly module library, in advance, for a single use, from basic commands, which command the aforementioned atomic and molecular basic operations, that can be parameterized via the parameters p1-p9.

For this, the parameter p1 defines a starting pose for the screwing process, and p2 defines a predetermined force in the tightening direction. Parameter p3 determines whether the screw is already screwed into the threading, or must first be inserted in the hole with the support of the robot. Parameter p4 defines a target torque for a torque controlled screwing, and parameters p5, p6 define a torque that is the maximum that may be reached, or the minimum that must be obtained in the force-regulated screwing. Parameter p7 provides an angle that the screw is to be turned through after reaching the end pose during the torque-regulated screwing, and parameters p8, p9 provide a torque that is the maximum that can be reached, or the minimum that must be obtained, respectively, in doing so.

One sees that through the input of a few parameters, different screwing processes, with or without initial insertion of the screw into the hole, or respectively, subsequent tightening, can be programmed, without the need thereby, for example, of programming a re-setting due to a limited tool turning angle range.

The previously explained process modules, with their parameters p1, p2, . . . are to understood as exemplary. In particular, an assembly module may contain fewer, more, or different parameters for searching, joining of pegs, joining of gear wheels, or for screwing.

From the preceding it is clear that according to one aspect of the present invention, first the assembly, manipulation and auxiliary operations are processed by robots, analyzed with, in particular, hybrid regulation, and similarities and differences thereby. From this, a basic command set and a process module library can be derived, such that programs can be efficiently created by non-specialized users, without expert knowledge, through combination and/or parameterization. The actual programming is thus carried out in advance through the creation of the basic commands and process modules, and the end user need only combine and/or parameterize said commands and modules.

Figure 5:
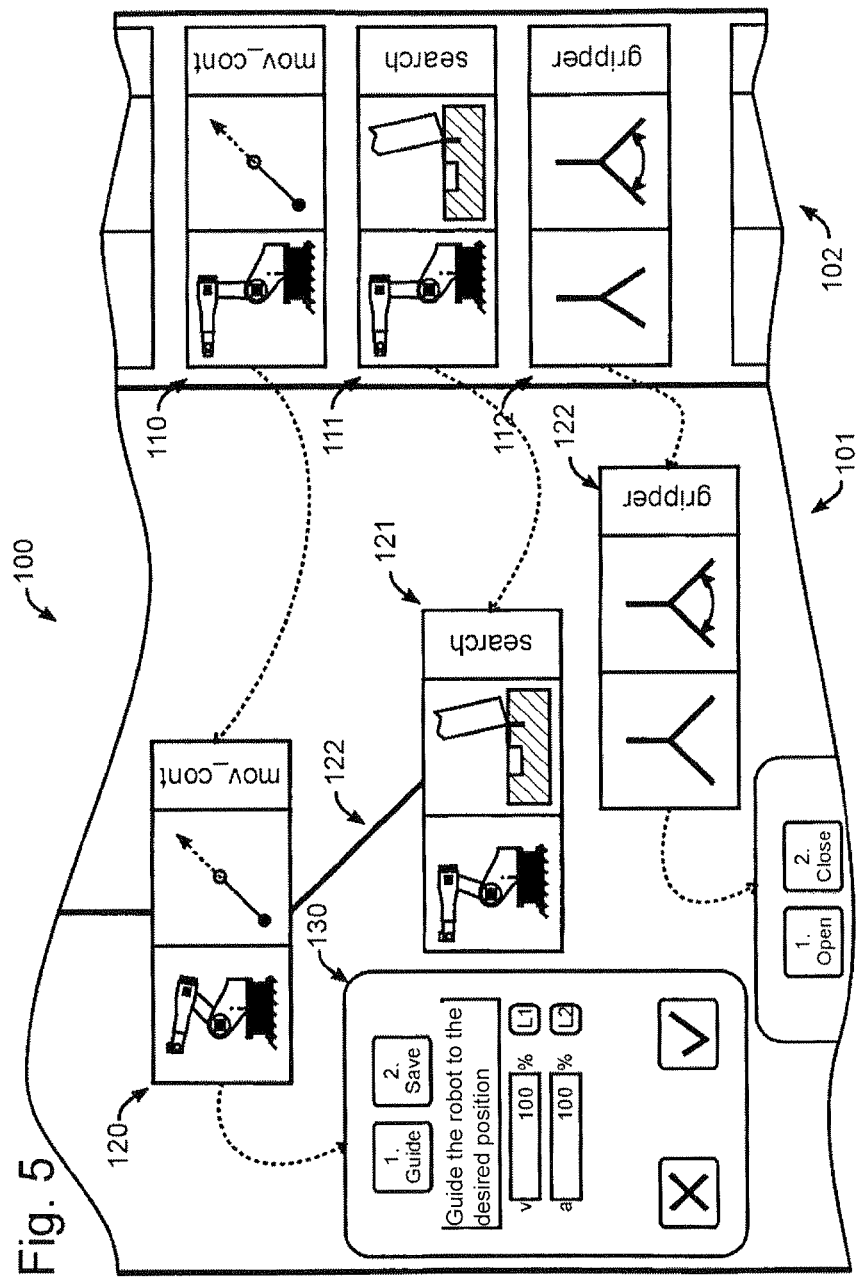

FIG. 5 shows a detail of a touchscreen 100 of a graphical programming environment according to one design of the present invention, during a programming of the manipulator process explained in reference to FIG. 1.

Available graphic function modules are represented by icons in a function module library 102 depicted as a section of the touchscreen 100. The user can select individual function modules by touching said, and drag them to an adjacent work area 101, formed as a section of the touchscreen ("drag&drop"), as indicated in FIG. 5 by a broken-lined arrow. A function module selected from the function module library 102 and moved to the work area 101 is replaced in the function module library 102 by an identical function module, such that the user may select and use the same function module repeatedly.

For greater clarity, only three selected function modules 120, 121, 122, or respectively, their basic patterns 110, 111, 121 are represented in the function module library 102.

The one function module 120, or 110, respectively, depicts the process module explained in reference to FIG. 1, which implements a position-regulated initiation of a pose with contact induced toggling to a compliant-regulation. For this, the icon in the left-hand portion comprises a representation of the selected kinematics, in this case a six-axis articulated arm robot, in the central region of a representation of the process module depicted by the function module, or the action, indicated by the broken line, depicted by the function module, respectively, in this case the assuming of a learned pose, which is indicated by an empty circle, as well as explanatory information in the right-hand region, in this case the name of the process module.

The other function module 121, or 111, respectively, depicts the process module "search," explained in reference to FIG. 1, which implements a scanning. In an analogous manner, the kinematics, action and information are represented by the icon.

In that a user drags the icon 111, as indicated by the broken-line arrow, by means of drag&drop, from the function module library 102 to the work area 101 to a position beneath the function module 120 already positioned there, and in the vicinity thereof, the function module 121 selected in this manner is automatically linked to the function module 120, such that the search of the process module "search" begins at the moment during the movement that the compliant-regulation is toggled to, as a result of making contact. This linking is symbolized by a connecting line 123, which can be changed when touched, e.g. when dragged to another function module (not shown).

By tapping on a function module positioned in the work area 101, such as the icon 120 in FIG. 5, said function module, as indicated by the broken-line arrow, can be activated, such that an auxiliary or input window 130 opens.

This input window 130 comprises two graphic control input buttons, which are implemented by means of the touchscreen 100, "1. Guide" and "2. Save," and explanatory auxiliary text, and input fields for two parameters, the speed v, and the acceleration a, in the example, as percentages of a predetermined maximum value, with which the learned pose is to be moved or advanced until contact has been made. Yet another control input or "UNDO" button "x" for the deactivation of the input window 130, deleting the input and maintaining of the previous parameter values, and a control input button "✓" for confirmation of an input, are provided next to this.

If the user has opened the input window 130 by tapping on the function module 120, then by tapping on the control input button "1. Guide," he can activate the robot that is to be programmed in a guide mode, in which he can manually guide the force-regulated robot to the scanning pose, e.g. to a pose shortly before, or in, contact with a workpiece that is to be processed. This is explained by means of the auxiliary text.

If the user has manually guided the robot to the scanning pose, he can save this pose as the scanning pose by tapping on the control input button "2. Save," and thereby parameterize the process module "mov_cont" in a simple, graphical manner, without the use of a high level language. Corresponding to the control command "touch up," this calling up and saving are also referred to as a control of the robot by means of the function module.

In a similar manner, the previously explained parameters p1-p10 of the process module "search(p1, p2, p3, p4, p5, p6, p7, p8, p9, p10)" can also be entered in an input window dedicated to the function module 121, wherein preferably default values are displayed, which can be modified by a user by means of the touchscreen.

In a variation that is not depicted, a CAD view of a workpiece can be called up by means of a function module, in which a position can be selected, by means of a mouse, for example, and assumed as a starting pose, for example, for a search, such that in turn a process module "search" is parameterized in part by means of the function module.

One sees that the robot can be controlled online during its programming by means of the function modules 120, 121 for the graphical programming environment, e.g. it can be toggled to a guidance mode, or its pose can be stored.

In the same manner, a robot gripper can be opened or closed by means of a function module "gripper," in that a corresponding icon 112 is selected from the function module library 102, moved to the work area 101 (FIG. 5: "122") and activated there by tapping, whereby the control input buttons "1. Open" and "2. Close" then enable, depending on the status of the tool, an opening or closing, which can be activated in an analogous manner to that described above in reference to the window 130.

For this, the function module 122 does not necessarily need to be linked to other function modules. If, for example, the user wants to open the robot gripper during the programming, in order to check its maximum range, he can simply drag a function module such as "gripper" into the work area 101, open the input window there by tapping, and by activating the control input button "1. Open," open the gripper directly, i.e. control the robot. As soon as he no longer needs the function module 122 for controlling or programming the robot, he can delete it. It is clear here as well, that the function module 122, or the sub-process implemented thereby, "gripper open/close," can be executed directly during the programming, without previous compiling of the overall program.

By comparing, on one hand, the icons 120-122, and on the other hand, 110-113, one sees that the representation is automatically changed after completion of the parameterization, and displays, respectively, the end pose of the manipulator or gripper, respectively, caused by the function module. In this manner, the programmed manipulator process is reproduced and recognizable in an intuitive manner by means of the sequence of icons 120, 121.

Moreover, in FIG. 5, to the right of the input fields for the parameters v and a, respectively, graphic control fields "L1" and "L2" are provided. By activating these fields, a higher level user, such as a programmer from the manufacturer, can block or unblock individual elements of the function module, in this case the selectable parameters v and a for lower level users, i.e. customers. As an example, the higher level user, having a rank of "2" can also allow a modification of the movement speed by less highly trained users by means of multiple tapping of the control field "L1," while a modification of the accelerations occurring thereby can only be made by users of the same rank. In an analogous manner, some of the parameters p1-p10 for the process module "search" can be blocked and/or hidden from users of a lower rank.

One sees that here as well, without mastering a high level language such as KRL, complex manipulator processes, such as those explained in greater detail in reference to FIG. 1, can be programmed in an intuitive manner, whereby robots that are to be programmed thereby are controlled by means of the function modules, e.g. they can be toggled to a guide mode.

In the embodiment examples, the invention is explained through the programming of a manipulator executed by a robot. As mentioned, a manipulator process according to the invention, programmed in accordance with the process module library and/or programming environment aspect, can also comprise numerous, in particular interacting, manipulators and/or supplementary axes, which can be implemented by means of transport and/or tensioning devices such as turning and/or tilting tables, or similar items.

REFERENCE SYMBOL LIST 1 peg for joining/searching
1' gear wheel to be joined
1" screw to be tightened
2 workpiece
2.1 recess
3 gripper
10 gear wheel
100 touchscreen (graphical programming environment)
101 work area
102 function module library
110 graphical function module "mov_cont" in function module library
111 graphical function module "search" in function module library
112 graphical function module "gripper" in function module library
120 graphical function module "mov_cont" in work area
121 graphical function module "search" in work area
122 graphical function module "gripper" in work area
123 link
130 auxiliary and input window
$F_H$ retaining force during re-orientation(s)
$F_z$ pressure force during search
$v_z$ search direction
R1, . . .
R3' rotation

The invention claimed is:

1. A computer for programming a robot including a manipulator, the computer comprising:
a non-transitory storage medium including a process module library comprising a plurality of process modules each including a plurality of basic commands selected from a shared basic command set, each basic command of the shared basic command set causing the manipulator to perform a basic operation when executed by the robot so that each process module defines a sub-process performed by the manipulator, and program code that, when executed by the computer, causes the computer to:
receive a first input selecting, from the process module library, a first process module defining a first sub-process and one of a second process module defining a second sub-process or a basic command;
receive a second input defining a link between the first process module and the second process module or the basic command;
in response to receiving the second input, link the first process module to the second process module or the basic command to generate a program defining a process;
in response to receiving a third input commanding an action by the manipulator, cause the manipulator to perform the action;
detect one or more parameters resulting from the action; and
parameterize one of the first or the second process modules based on the one or more detected parameters.

2. The computer of claim 1 wherein the program code further causes the computer to define the process module library so that at least one parameter of at least one of the process modules defines a type of sub-process or kinematic property of the manipulator when executed by said process module.

3. The computer of claim 1 wherein the program code further causes the computer to define the process module library so that a sub-process of a pose search comprises searching for a starting pose for a joining process having one or more form locking joining connections, screwing, gripping, aligning, calibrating, or checking on a success of a process.

4. The computer of claim 1 wherein the program code further causes the computer to define the process module library so that an assembly process, executed by one or more of the process modules, comprises a joining process between components with a cross-section that is rotationally symmetric in a joining direction, and/or a joining process between components that includes moving a corner of one of the components to a corner of the other of the components.

5. The computer of claim 1 wherein the program code further causes the computer to define the process module library so that the basic operation comprises at least one regulation, movement, interruption routine, tool operation, pose management, checking of a condition, and/or a peripheral operation.

6. The computer of claim 1 wherein the program code further causes the computer to define the process module library so that the basic operation comprises a compliance-regulation and/or a force-regulation.

7. A method for programming a robot that includes a manipulator using a process module library stored in a storage medium of a computer, the process module library comprising a plurality of process modules each including a plurality of basic commands selected from a shared basic command set, each basic command of the shared basic command set causing the manipulator to perform a basic operation when executed by the robot so that each process module defines a sub-process performed by the manipulator, the method comprising:
selecting, by the computer in response to a first input from a user, a first process module defining a first sub-process and one of a second process module defining a second sub-process or a basic command;
defining, by the computer in response to a second input from the user, a link between the first process module and the second process module or the basic command to generate a program defining a process;
causing, by the computer in response to a third input from the user, the manipulator to perform an action;
detecting, by the computer, one or more parameters resulting from the action;

parameterizing, by the computer, one or more of the parameters of the first or the second process modules based on the one or more detected parameters ; and programming, by the computer, the robot with the program, wherein programming the robot with the program configures the robot to cause the manipulator to perform the process.

8. The method of claim 7, further comprising:

identification, by the computer, of a plurality of sub-processes for various manipulator processes;

identification and creation, by the computer, of the shared basic command set for the plurality of sub-processes;

creation, by the computer, of the process modules for execution of the identified sub-processes through linking of basic commands of the shared basic command set; and making, by the computer, the created process modules available to the process module library.

9. A computer comprising a non-transitory storage medium including program code that, when executed by the computer, causes the computer to:

provide a graphical programming environment for the programming of a manipulator process, the programming environment having a plurality of graphical function modules selectable by a user for execution of one sub-process each;

control at least one sub-process and/or at least one manipulator during the programming of the manipulator process by at least one of the function modules;

detect one or more parameters resulting from the control of the at least one sub-process and/or the at least one manipulator; and configure the graphical programming environment so that each function module reproduces a process module or a basic command of a process module library comprising a plurality of parameterizable process modules for the respective execution of the sub-processes corresponding to the function modules, each of the process modules including a plurality of basic commands selected from a shared basic command set and being configured to be linked to another process module or a basic command, wherein one or more parameters of one or more of the process modules are specified by the computer based on the one or more detected parameters.

10. The computer of claim 9 wherein the program code further causes the computer to configure the graphical programming environment so that a sub-process implemented by a selected function module is executed during the programming in response to activation of the selected function module by the user.

11. The computer of claim 9 wherein the program code further causes the computer to configure the graphical programming environment so that the one or more parameters for each process module are specified, at least in part, by at least one of the function modules.

12. The computer of claim 9 wherein the program code further causes the computer to configure the graphical programming environment so that the function modules are manipulated by touching a display interface.

13. The computer of claim 9 wherein the program code further causes the computer to configure the graphical programming environment so that two function modules are automatically linked in response to one of the two function modules being positioned in a vicinity of the other of the two function modules.

14. The computer of claim 9 wherein the program code further causes the computer to configure the graphical programming environment so that each function module comprises a representation of a kinematic property, action, and/or information.

15. The computer of claim 9 wherein the program code further causes the computer to configure the graphical programming environment so that a graphic representation of a selected function module changes depending on a parameter of the selected function module.

16. The computer of claim 9 wherein the program code further causes the computer to configure the graphical programming environment so that an element of one or more of the function modules changes and/or is displayed depending on a status of the user.

17. A computer program product having program code stored on a non-transitory machine readable data medium, the program code configured to, when executed by a computer, cause the computer to:

provide a process module library for programming a manipulator to perform a manipulator process, the process module library including a plurality of process modules for the respective execution of one sub-process each by the manipulator;

receive a first input selecting, from the process module library, a first process module defining a first sub-process and one of a second process module defining a second sub-process or a basic command;

receive a second input defining a link between the first process module and the second process module or the basic command;

in response to receiving the second user input, link the first process module to the second process module or the basic command to generate a program defining a process;

in response to receiving a third user input commanding an action by the manipulator, cause the manipulator to perform the action;

detect one or more parameters resulting from the action; and parameterize one of the first or the second process modules based on the one or more detected parameters, wherein the process modules each comprise a plurality of basic commands of a shared basic command set for execution of a basic operation by the manipulator, and programming a robot with the program configures the robot to cause the manipulator to perform the process.

18. The computer program product of claim 17, wherein the program code further causes the computer to:

select, in response to an input from a user, at least one process module of the process module library; and parameterize the at least one process module of the process module library.

19. The computer program product of claim 17, wherein the program code further causes the computer to:

provide a graphical programming environment for the programming of the manipulator process, the programming environment having a plurality of graphical function modules selectable by a user for the execution of one sub-process each, wherein at least one sub-process or at least one manipulator is configured to be controlled during the programming of the manipulator process by at least one of the function modules.

20. A method for programming a manipulator process using a graphical programming environment, the method comprising:

linking, by a computer, a plurality of graphic function modules;

controlling, by the computer, at least one manipulator and/or sub-process during the programming by at least one of the function modules of the programming environment;

detecting one or more parameters resulting from the controlling of the least one manipulator and/or sub-process during the programming; and parameterizing one or more process modules based on the one or more detected parameters, wherein the one or more process modules are part of a process module library comprising a plurality of parameterizable process modules for the respective execution of the sub-processes corresponding to the function modules, each of the process modules including a plurality of basic commands selected from a shared basic command set and being configured to be linked to another process module or a basic command.

* * * * *